Figure 1:
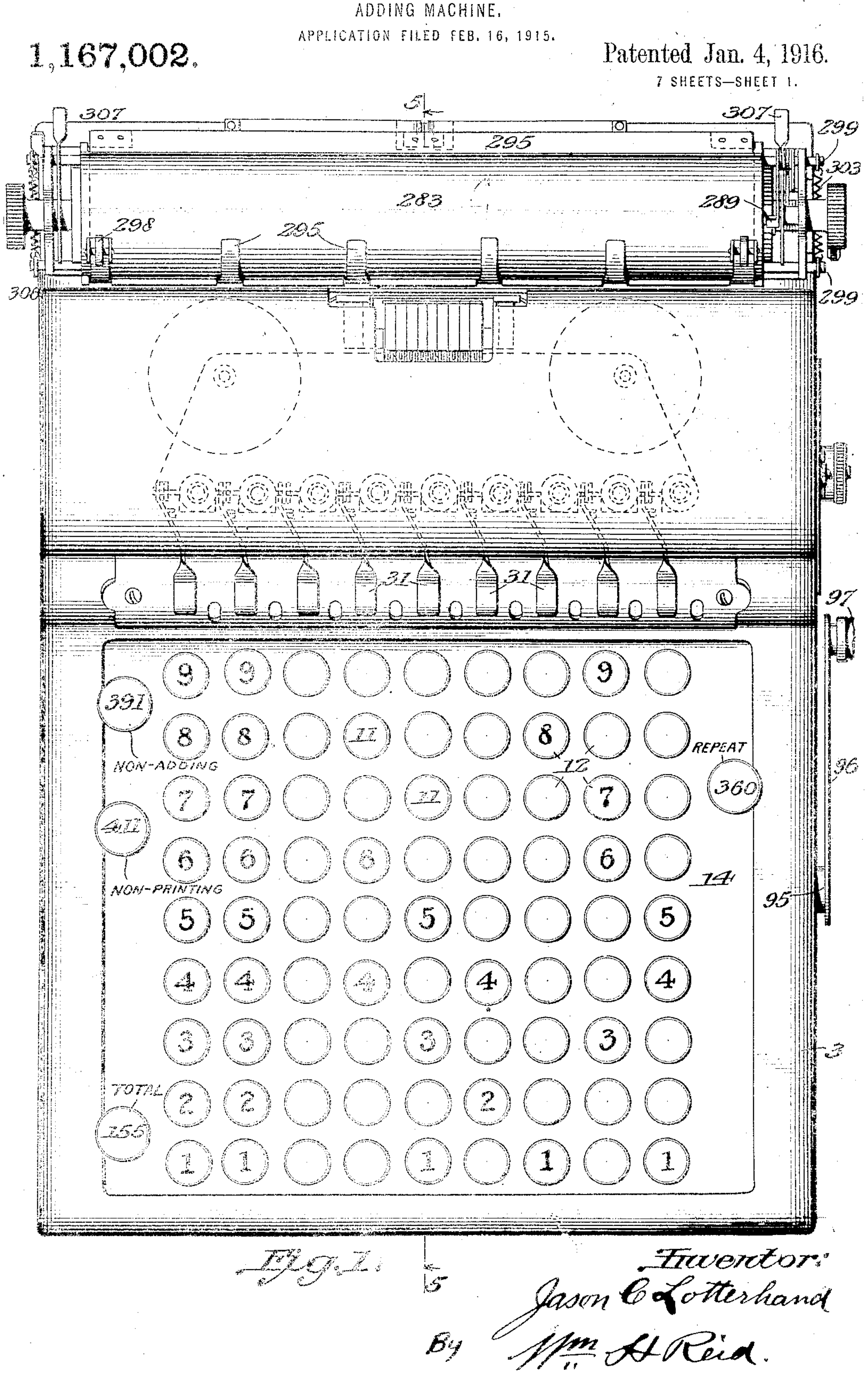

J. C. LOTTERHAND.
ADDING MACHINE.
APPLICATION FILED FEB. 16, 1915.

1,167,002. Patented Jan. 4, 1916.

7 SHEETS—SHEET 1.

Inventor:
Jason C Lotterhand
By Wm H Reid.

J. C. LOTTERHAND.
ADDING MACHINE.
APPLICATION FILED FEB. 16, 1915.

1,167,002.

Patented Jan. 4, 1916.

7 SHEETS—SHEET 2.

Witnesses:
Eric B. Kinney.
Morris Kramer.

Inventor
J. C. Lotterhand.
By his Attorney
William H. Reid.

J. C. LOTTERHAND.
ADDING MACHINE.
APPLICATION FILED FEB. 16, 1915.

1,167,002.

Patented Jan. 4, 1916.

7 SHEETS—SHEET 3.

Witnesses:
Eric B. Kramer
Morris Reamer

Inventor
J. C. Lotterhand.
By his Attorney
William H. Reid

J. C. LOTTERHAND.
ADDING MACHINE.
APPLICATION FILED FEB. 16, 1915.
1,167,002.
Patented Jan. 4, 1916.
7 SHEETS—SHEET 4.
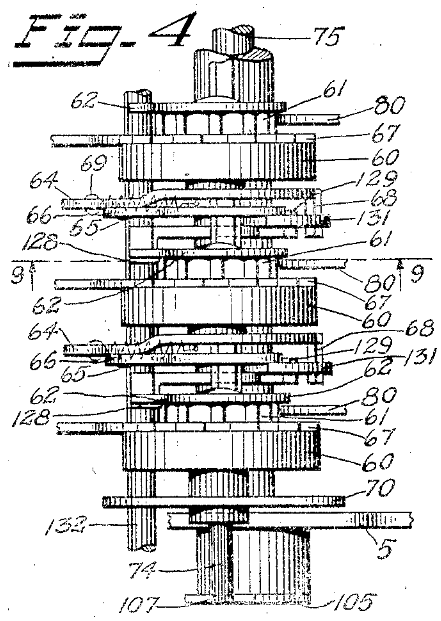
FIG. 6
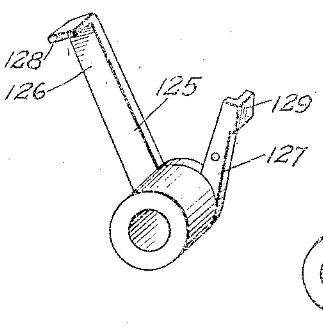
FIG. 7
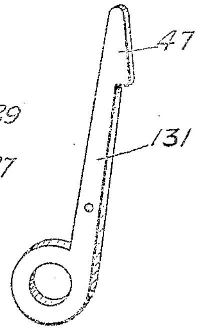
FIG. 5
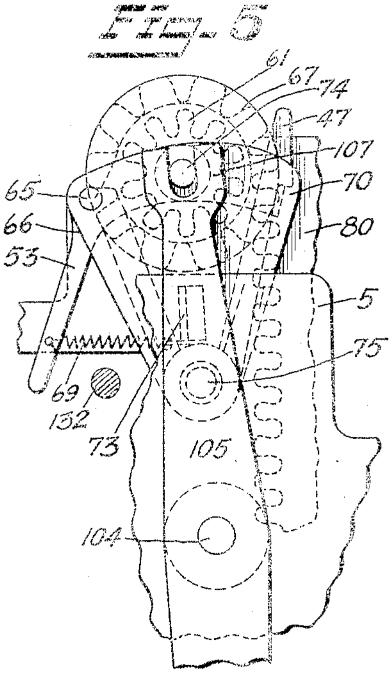
FIG. 8
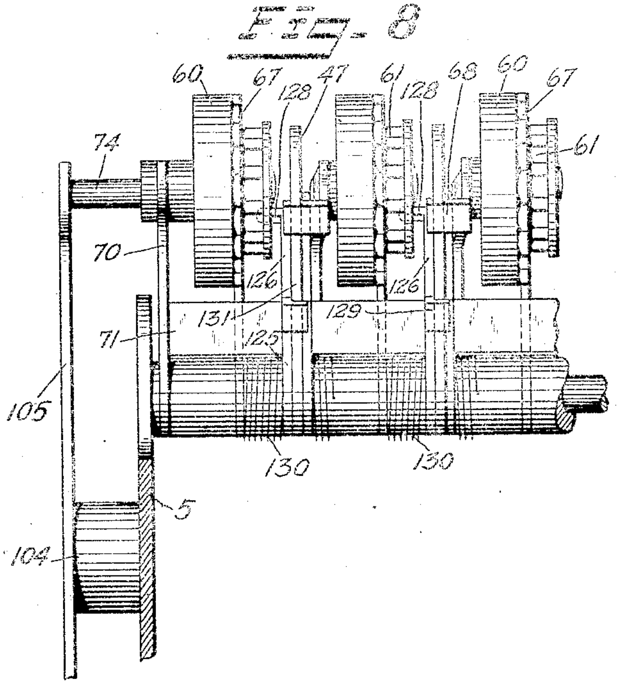
Witnesses:
Eric B. Kramer.
Morris Kramer.
Inventor
J. C. Lotterhand.
By his Attorney
William H. Reid.

J. C. LOTTERHAND.

ADDING MACHINE.

APPLICATION FILED FEB. 16, 1915.

1,167,002. Patented Jan. 4, 1916.

7 SHEETS—SHEET 5.

Witnesses:

Inventor

J. C. Lotterhand.

By his Attorney

William H. Reid

J. C. LOTTERHAND.

ADDING MACHINE.

APPLICATION FILED FEB. 16, 1915.

1,167,002.

Patented Jan. 4, 1916.

7 SHEETS—SHEET 6.

Witnesses:

Eric B. Kramer

Morris Reamer

Inventor

J. C. Lotterhand.

By his Attorney

William H. Reid.

J. C. LOTTERHAND.
ADDING MACHINE.
APPLICATION FILED FEB. 16, 1915.

1,167,002.

Patented Jan. 4, 1916

7 SHEETS—SHEET 7.

Witnesses:
Eric B. Kramer
Morris Reamer.

Inventor
J.C. Lotterhand.
By his Attorney William H. Reid

UNITED STATES PATENT OFFICE.

JASON C. LOTTERHAND, OF NEW YORK, N. Y., ASSIGNOR TO ADDOMETER CORPORATION, OF NEW YORK, N. Y., A CORPORATION OF DELAWARE.

ADDING-MACHINE.

1,167,003. Specification of Letters Patent. Patented Jan. 4, 1916.

Original application filed February 24, 1908, Serial No. 417,352. Divided and this application filed February 16, 1915. Serial No. 8,475.

*To all whom it may concern:*

Be it known that I, JASON C. LOTTERHAND, a citizen of the United States, and a resident of New York city, in the county of New York and State of New York, have invented certain new and useful Improvements in Adding-Machines, of which the following is a specification.

This invention relates to the type of adding machines in which the various items or numbers are listed or printed as they are set up in the machine by the operation of the several keys, and then, through an actuating member such as a handle, or a power driven device causes the total of these items to be listed or printed on the sheet carried by the platen.

One of the objects of this invention is to provide an improved form of accumulating or transfer mechanism, that serve to carry from any denomination to the next higher one, in the automatic operation of the machine.

Another object of the invention is to provide an improved form of latch device for retaining depressed a key-stem, that will easily and quickly release the key-stem through a lateral movement of the latch, and which latch will automatically when released from the key-stem, move to an inoperative position, and not engage the key-stem when next depressed.

Another object of the invention is to provide improved means for insuring a full movement being imparted through the main operative shaft after initial movement thereof, and a total key operating in connection therewith whereby the total key is retained depressed until the said means has caused a full movement of the main shaft.

A further object is to provide improved means for controlling the movement of the adding pinions, especially when a total is being obtained.

This application is divided out of an application filed by me February 24, 1908, Serial No. 417,352.

Figure 2:
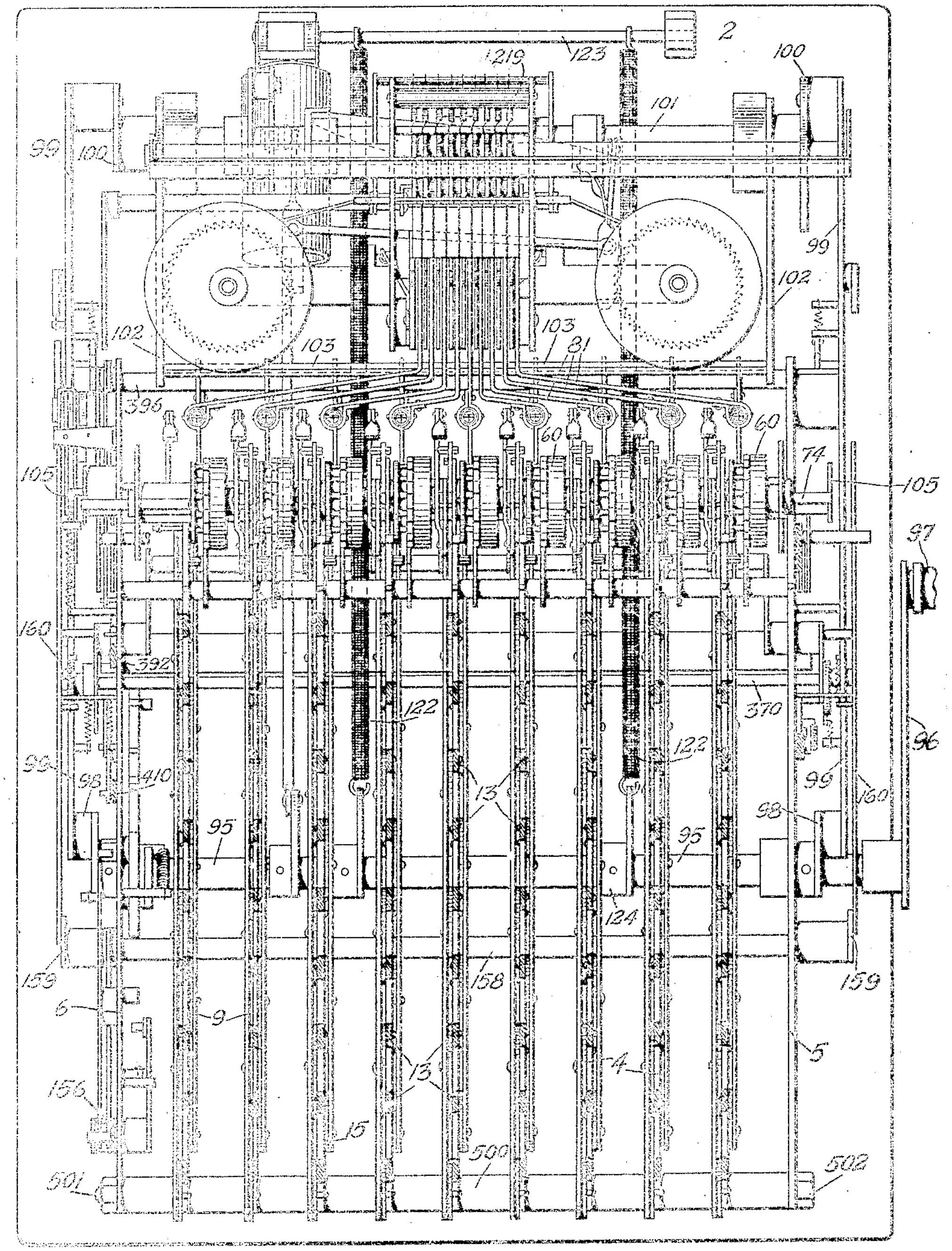
Figure 3:
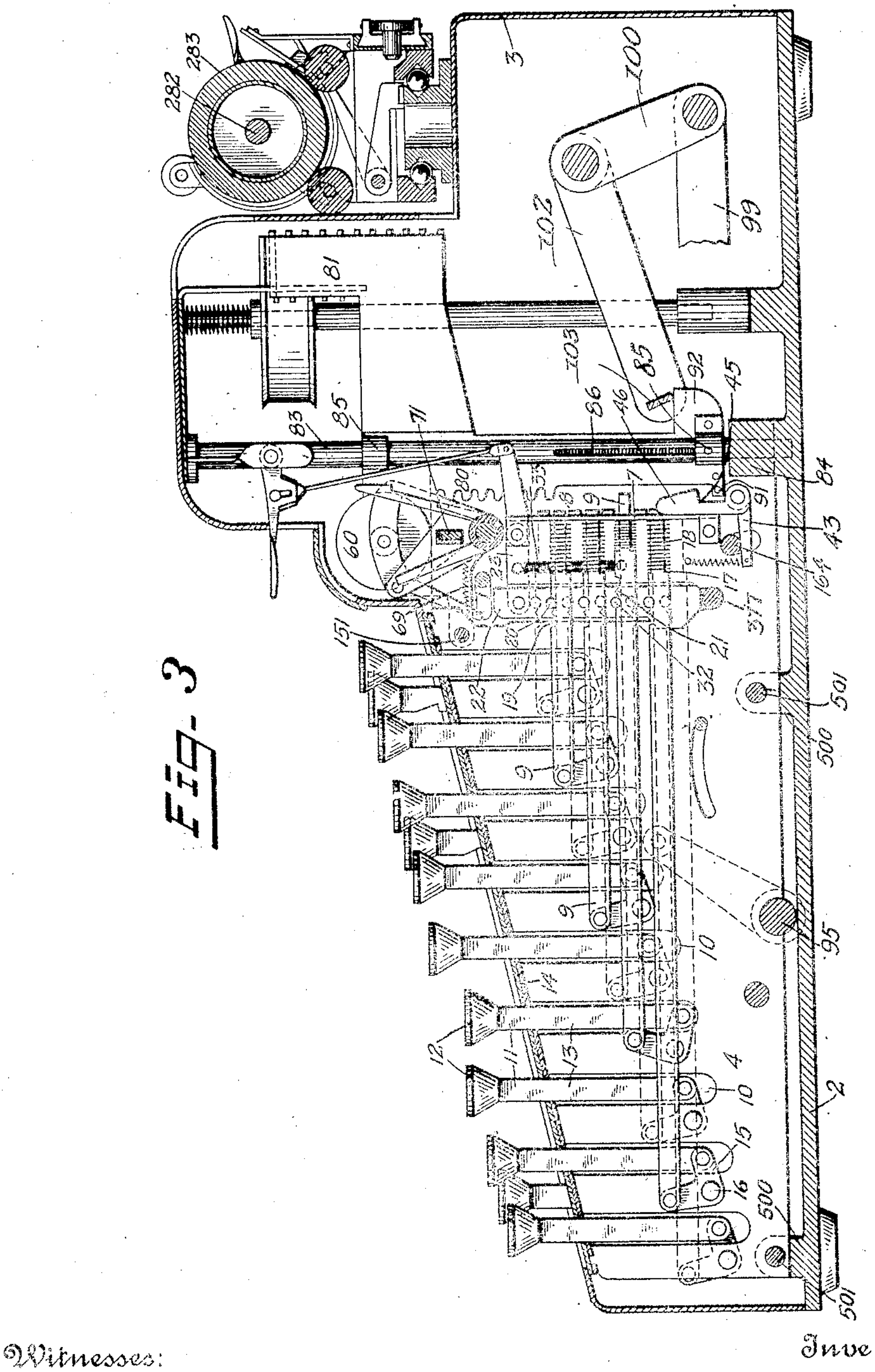
Figures 9, 10, 11, 12, 13, 14, 15:
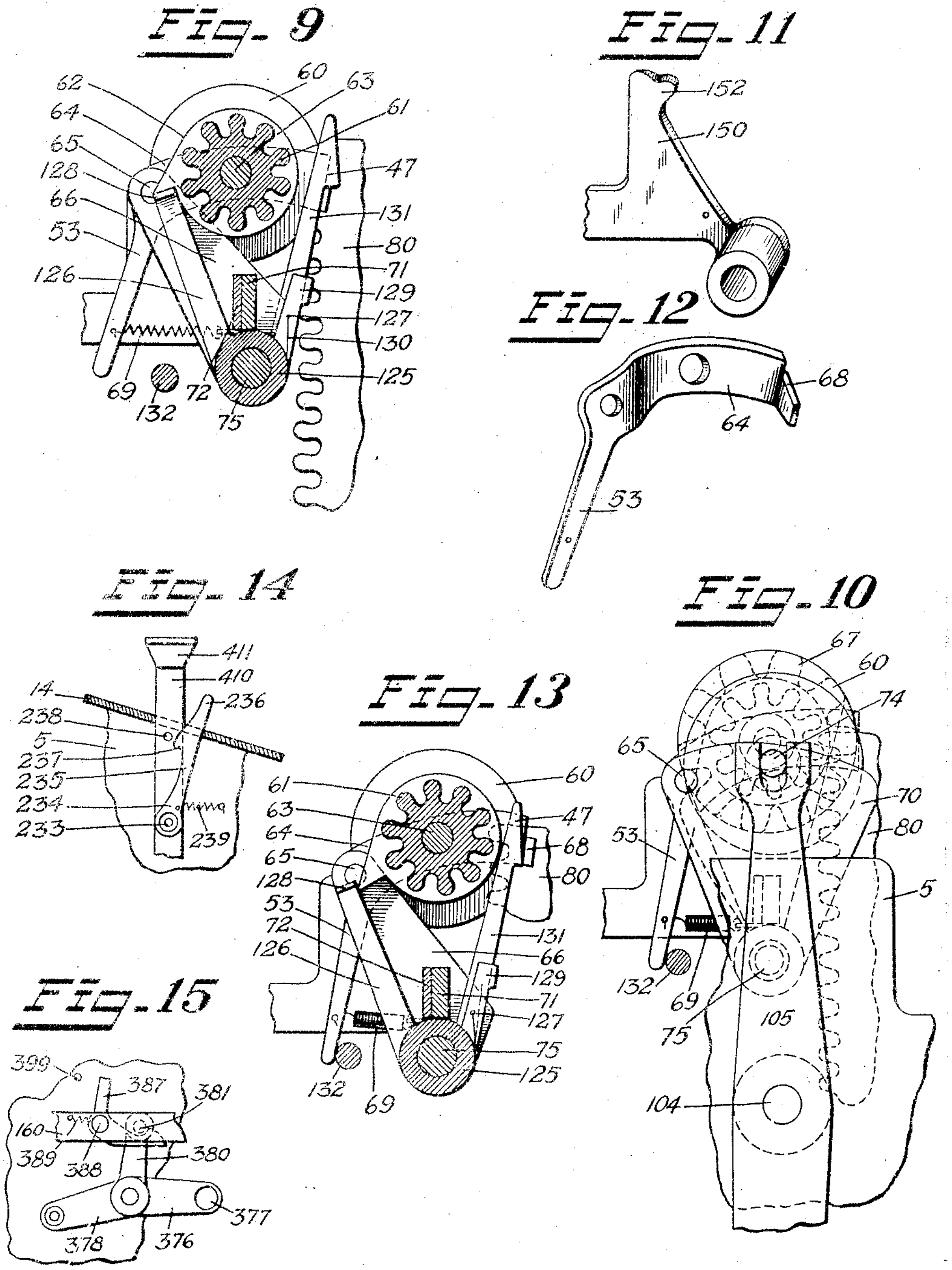
Figures 16, 17, 18, 19, 20, 21:
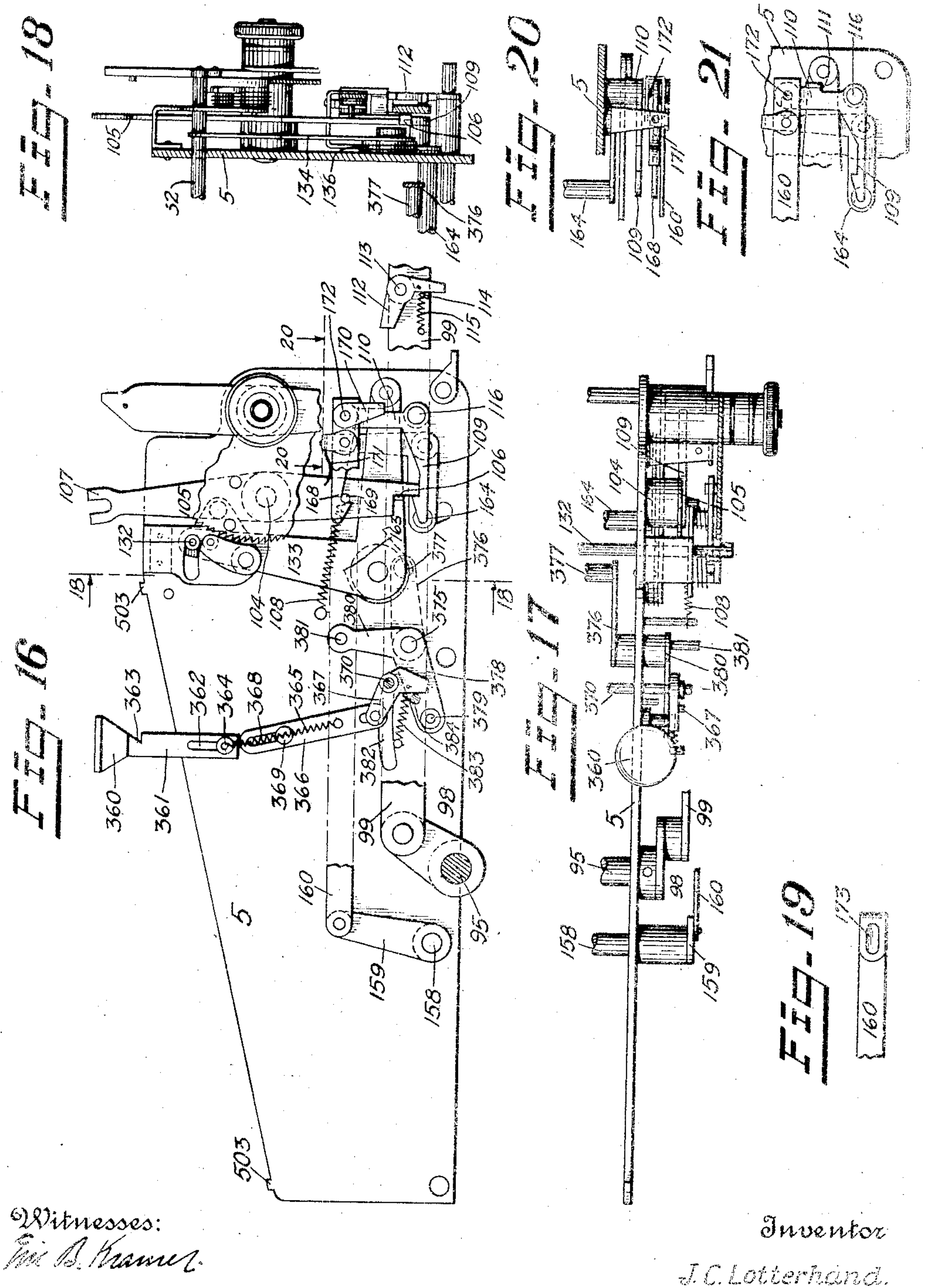
Figures 22, 23, 24, 25, 26:
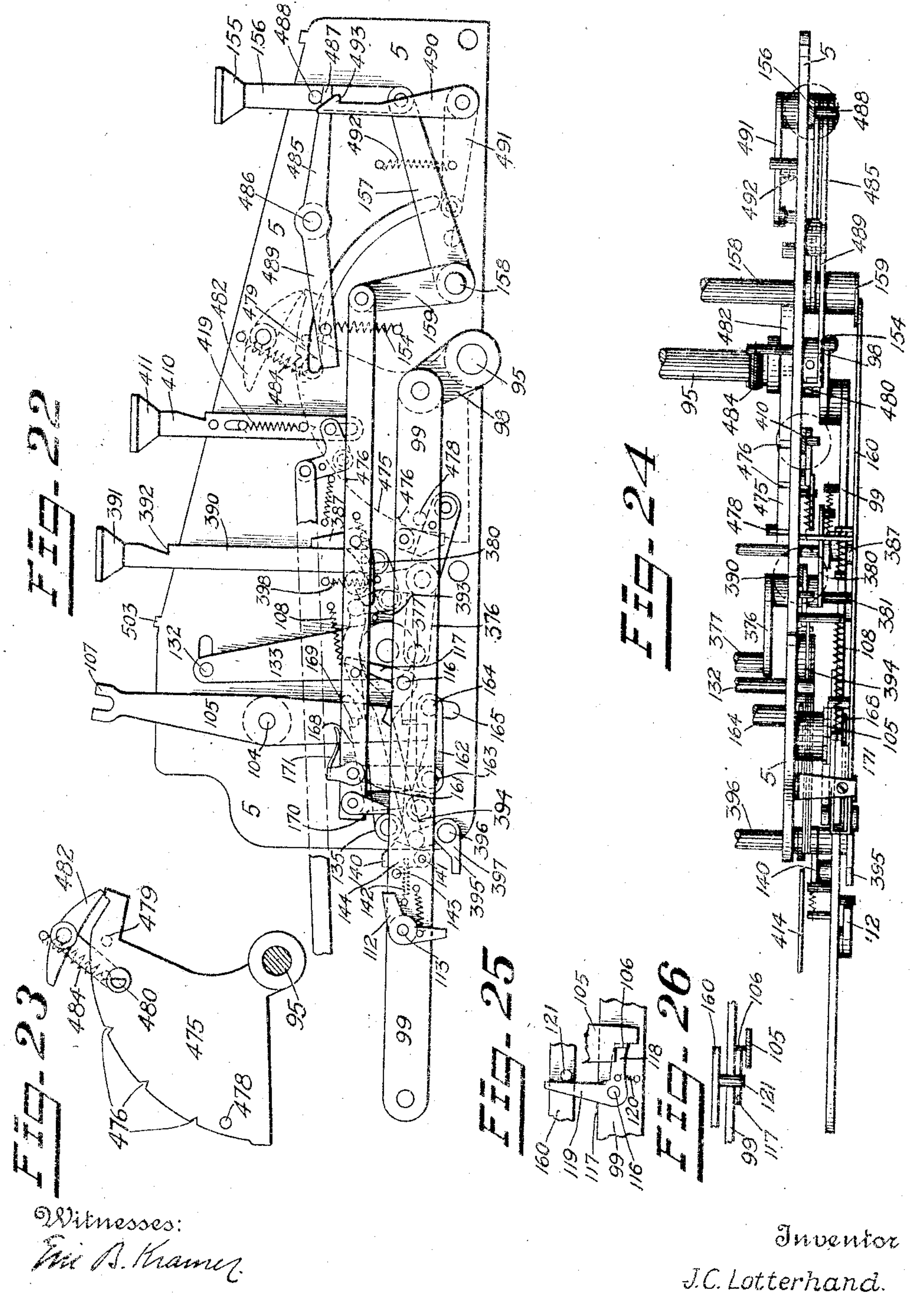

In the accompanying drawings illustrating embodiments of my invention, Figure 1 is a top plan view of the machine. Fig. 2 is a plan view of the parts with the casing removed, certain parts being shown in horizontal section. Fig. 3 is a central vertical section taken longitudinally of the machine. Fig. 4 is an enlarged detail plan view of some of the numeral wheels and connected parts. Fig. 5 is a side elevation of the parts shown in Fig. 4. Fig. 6 is a perspective detail of the carrying arm release pawl. Fig. 7 is a perspective detail of the carrying arm latch. Fig. 8 is a rear elevation of the parts shown in Figs. 4 and 5. Fig. 9 is a vertical section on the line 9—9 of Fig. 4, certain parts being shown in elevation. Fig. 10 is a similar view with the parts in different positions. Fig. 11 shows a numeral wheel detent. Fig. 12 shows the numeral wheel support and carrying restoring lever. Fig. 13 is a view similar to Fig. 9 with the parts in another position. Fig. 14 shows the latched device for the special keys. Fig. 15 shows a canceling latch elbow. Fig. 16 is a side elevation of the right hand supporting plate and parts carried thereon. Fig. 17 is a top plan view of the parts shown in Fig. 16. Fig. 18 is a section on the line 18—18 of Fig. 16. Fig. 19 is a side elevation of the rear end of the total bar. Fig. 20 is a top plan view of the parts beneath the plane of the line 20—20 of Fig. 16. Fig. 21 is a side elevation of some of the parts shown in Fig. 20. Fig. 22 is a side elevation of the left hand supporting plate and parts carried thereon. Fig. 23 is a detail of the full stroke supporting sector. Fig. 24 is a top plan view of the parts shown in Fig. 22. Fig. 25 shows the numeral wheel lever resetting mechanism, and Fig. 26 is a top plan view of the parts shown in Fig. 25.

In the drawings the parts are shown mounted upon and within a frame work comprising a base plate 2 and an outer casing 3 completely enveloping the machine and suitably apertured to permit of the passage of some of the parts. It is provided with a series of vertically arranged upwardly projecting plates 4 (see Fig. 3), adapted to serve as supports for the key system, and with two other similar plates 5 and 6 (see Fig. 2), to support other parts as hereinafter set forth. Each of these plates 4, 5 and 6 are mounted in slots formed in the transverse ribs 500 made integral with or secured to the base of the machine. Each rib is longitudinally apertured, and when the plates are in position, a retaining bolt 501 is passed through such aperture and also through apertures in the plates registering therewith, and a nut 502 engaging the end of the bolt holds the plates firmly in position. Each of these plates at its upper edge is provided with two projections 503 (see Fig. 16), adapted to engage with suitable slots in the key plate 14 hereinafter set forth. Each plate 4 at its rear end is provided with a transverse guide plate 7 (see Fig. 3), having slots 8 to guide stop bars 9 hereinafter set forth. Each plate 4 is also provided with a series of recesses 10 to receive the key stems hereinafter set forth.

Projecting upwardly through the casing 3 are the keys 11 arranged in denominational series in banks in the usual manner, each key comprising a finger piece 12 and a depending stem 13 movable in the recesses 10 of the plate 4, and guided by a suitable aperture in the upper key plate 14.

At its lower end each key stem 13 is hinged to one end of an elbow lever 15 pivoted at 16 to the plate 4, the other end of the elbow lever being hinged to a horizontal stop bar 9. The rear end of the stop bar passes through the aperture 8 in the guide plate 7, and the stop bar is retracted by a spring 18 thereon that engages a shoulder 17 on the stop bar and also the guide plate 7. Each stop bar has notches 19 and 20 on its upper edge, that alternately engage studs 32 projecting on opposite sides of a latch bar 22. There is one latch bar 22 for each series or bank of keys and stop bars, that is mounted on arms 23 and 24, pivoted to the plate 4; and a coil spring 33 draws the latch bars downwardly tending to retain the stud 32 in one of the recesses or notches 19 or 20.

In the normal position of the keys and stop bars, the stud 32 rests in the notch 20, and upon depression of a key stem the stop bar 9 will move rearward, and the summit or angle 21 between the adjacent notches will serve to elevate the stud and latch bar, until the stud passes over the apex, when the spring 33 will draw the latch bar downward and the stud will move into the notch 19, serving to hold the stop bar in the rearward position.

As shown in Fig. 3 there is a vertical rack and type plate 81 to the rear of each bank of keys and stop bars, that have racks 80 cut in their front edges at the upper portion, and which carry suitable type in their rear extension arranged to engage a suitable platen 283 mounted on a carriage 276 at the rear of the machine. Vertical rods 83 are engaged by loops 85 on the plates 81, these rods being seated in sockets 84 on the base, and suitably supported at the top. These rods are tubular and each contains a spring 86 connected with the plate 81 to move it upwardly when released. In this art it is usual to have a controlling member known as a universal bar that can engage a rearward projection 92 on each plate 81, to return the plate when elevated by these coil springs. At the front of each plate at its lower end is a foot 91, that when the universal bar permits the rack and type plate to rise, will engage the stop bar 9 that may have been advanced by the depression of a key.

The accumulating mechanism consists of the numeral wheels and their connections; the numeral wheels being arranged at the rear of the key system in the upper part of the casing. Each numeral wheel 60 is provided with a disk 67 having peripheral recesses, a pinion 61, and a cam plate 62, secured thereto or made integral therewith as desired, (see Figs. 5, 8, 9, 10 and 13). The wheel 60 is centrally apertured and loosely revolves on a shaft 63 secured to and projecting laterally from an arm 64, which in turn is mounted on a pivot 65 projecting laterally from a supporting plate 66. Each arm 64 has a tail 53, and at its rear end is provided with a laterally projecting catch 68 made by bending to one side a portion of the arm itself. A spring 69 exerts a constant inward tension on the arm. Each numeral-wheel is arranged to display on its periphery the numbers from "1" to "0" in regular order in the manner usual to this art, and it is obvious that there is one numeral wheel for each denominational series of keys. These supporting plates 66 are arranged in transverse series across the machine, each plate having a rectangular aperture adapted to receive a bar 71 common to all of the plates, and which holds them together and compels them to move in unison. The plates 66 are spaced apart by means of supplementary bars 72 secured to the bars 71 by screws 73. Each plate is apertured to receive a shaft 75 mounted transversely across the machine and terminating in the plates 5 and 6. The several plates 66 constitute in effect a multiple frame supporting the numeral wheel system. There are two other plates 70 (see Figs. 4, 5, and 10), one mounted at each side of this multiple frame and which are each provided with a rectangular aperture to receive the bar 71, and a round aperture to receive the shaft 75, (see Figs. 4, 5, and 10). These plates are provided with projecting pins 74, so that when these pins are moved the numeral wheel system is moved as an entirety and oscillates on the shaft 75. The rotation of the numeral wheels is secured by the engagement of their pinions 61 with movable rack and type plates 80.

The main shaft 95 of the machine is mounted in suitable bearings in the base 2 (see Fig. 3), and adapted to be oscillated in any suitable manner, preferably by a handle 96 terminating in a gripping member 97. Rigidly secured to the shaft 95 are two crank arms 98, one on each side of the machine, and one of which is pivoted to a horizontal connecting bar 99, that in turn is pivoted to one arm of a lever 100, secured to a transverse shaft 101 adapted to oscillate on suitable bearings projecting upwardly from the base 2 at the rear of the machine. The other arms 102 of the levers 100 carry a transverse bar 103, known as the universal bar.

Suspended on pivots 104 on the plates 5 and 6 are upright rocking levers 105, one on each side of the machine, each provided with a laterally extending foot 106 (see Fig. 16), and with a forked head 107 adapted to engage the pin 74 (see Figs. 5, 8, and 10), on the end plate 70 provided for that purpose. A spring 108 tends to move the upper end of each lever 105 toward the rear of the machine (see Fig. 16) and thus move the numeral wheel pinions into engagement with their respective racks. Hooks 109 pivoted in bearings on the frame of the machine engage the levers 105 to hold them against the tension of their springs 108. Each hook 109 has an upwardly projecting arm 110 recessed at 111 (see Fig. 21) and arranged in the path of a trip 112 secured by pivot 113 to the bar 99 and provided with a stop pin 114 and a spring 115 (see Fig. 16).

Secured to each bar 99 by pivot 116 is an elbow lever 117. Its lower arm 118 is adapted to move against the foot 106 when the bar 99 is moved rearwardly (see Figs. 22, 24, and 25). Its upper arm 119 has a function which will presently appear. A spring 120 is adapted to hold the lever 117 against a stop pin 121 mounted on the bar 160. Suitable springs 122 secured to a rod 123 supported from the base of the machine, and suitable connections 124 to the main shaft from such springs, serve to retract the parts to their initial positions after actuation.

In order to comprehend the construction of the carrying mechanism, it is necessary to understand the adding operation. Generally speaking, an item is enumerated on the machine by depressing the appropriate keys. These through the proper connections, move forward the respective stop bars into the plane of the path of the racks 80. The handle 96 being then drawn forward, or the main shaft 95 being otherwise actuated, the bars 99 are moved, and through the proper connections, the restoring bar 103 is moved upward and away from the projections 92, and permits the plates 81 to rise under the influence of their respective springs 83, until the projections 91 contact with the respective stop bars 9, except such plates in the series in which no key has been depressed. Such plates rise a slight distance in order to position the types to print zeros. The stroke of the handle being continued, the rocking levers 105 are released by the movement of the trip 112 against the arm 110 or hook 109, thus disengaging the hook from the lower end of the lever 105, whereupon the teeth of the numeral wheels are at once thrown into engagement with their respective racks. On the reverse stroke of the handle, the bar 99 is moved rearwardly and the restoring bar 103 contacting with the projections 92 moves the plates 81 downwardly, and the numeral wheels are thereby rotated, each to an extent determined by the elevation of the particular plate 81 on which its corresponding rack is mounted. Near the end of the rearward stroke of the handle, the carrying lever 117 contacts with the foot 106 of the lever 105, and moves the lever back to its original position, and thus swings the numeral wheels away from their racks. It will be remembered that the pinions 61 and cams 62 (see Figs. 4 and 5), are on the left side of each numeral wheel 60, or on that side toward the wheel of next higher order. On the shaft 75 is loosely mounted an acute angled elbow 125, which has a long arm 126 and a short arm 127, each projecting upwardly from the shaft. (See Figs. 4 and 6). The arm 126 is provided at its extremity with an ear 128 projecting toward the right so as to engage the cam 62. The arm 127 is provided at its extremity with an ear 129 projecting toward the left, that is, toward the wheel of next higher order. A spring 130 serves to retract the elbow 125 to position after it has moved therefrom.

Loosely mounted on the shaft 75, between the elbow 125 of one numeral wheel and the rocking arm 64 of the wheel of next higher order, is a hook 131 extending upwardly (see Fig. 7) and provided at its ends with a beak 47 adapted to engage the catch 68 on the arm 64 to hold it against the tension of its spring 69. The ears 129 on the elbow 125, adjacent the wheel of lower order, project into the path of hook 131 adjacent to the wheel of next higher order, and when rotation of the wheel of lower order beyond "9" occurs, such rotation moves the cam 62 against the ear 128 to trip the elbow 125 forward; and moving the arm 127, its ear 129 engages hook 131 adjacent the wheel of next higher order and moves the hook forward and out of engagement with the catch 68 of the rocking arm 64 of the wheel of next higher order, and this arm 64, under the influence of its spring 69 is oscillated and carries its numeral wheel upward. As the teeth of the numeral wheels are in engagement with the respective racks, the wheels are thus rotated in the direction of movement of the racks, and the parts are so arranged that the rotation is equivalent to the distance between two adjacent teeth of the pinions. In other words, the movement has caused the numeral wheels of next higher order to carry one. The movement of the tail piece 53 and of its wheel is limited by a rod 132 which, during the carrying operation, is stationary and serves as a stop against which the tail pieces 53 impinge. This rod 132 is carried by two elbows 133 pivoted to the plates 5 and 6. Each elbow has an arm 134 (see Figs. 16, 18, 22 and 25) terminating in a roller 135. A spring 136 serves to return the elbow to position and a stop 137 limits such movement.

Mounted on the bar 99 is a cam piece 140 adapted to oscillate on a pivot 141, and held under tension of a spring 142 and against a stop pin 143. The forward movement of bar 99 toward the right (see Fig. 22), brings a sloping surface 144 of this cam piece against the roller 135 and thus tilts the lever 133 and moves it and rod 132 to engage the tails 53 of the arms 64, to move the numeral wheel system back to its initial position until the arms 64 are latched by the hooks 131. It will be understood that in the meantime, and before this restoring operation takes place, the numeral wheels have been moved out of engagement with their respective racks. The return of the numeral wheel system to its initial position, as it is swung upon the upright levers 105, may result in an accidental displacement or rotation of one or more of the wheels on its shaft. To prevent this locks are provided which hold the wheels in the positions to which they have been rotated. These locks (shown in detail in Fig. 11) comprise a series of fixed plates 150 rigidly mounted upon a transverse bar 151 secured between the plates 5 and 6, each plate 150 being provided with a rearwardly projecting detent 152 adapted to be engaged by the recesses on the edge of disk 67. After several items have been enumerated and accumulated, and it is desired to take a total, means are provided whereby the total is automatically recorded as will be hereinafter described; but the means for restoring the wheels to zero to enable a new series of items to be enumerated and accumulated, will now be described. At a convenient place on the machine, in this instance on the plate 6, is mounted a totalizing key 155, (see Figs. 1, 22 and 24), having a stem 156 hinged to one end of a lever 157, the other end of the lever being secured to a shaft 158 arranged across the machine.

On shaft 158 are mounted two arms 159, one on each side of the machine, each one of which is pivoted to a bar 160 which in turn is hinged to an upper arm 161 of an elbow 162 adapted to swing on a pivot 163, so that the bar 160 reciprocates in a horizontal direction. The lower arms of elbows 162 carry a transverse rod 164 which passes through slots 165 in plates 4, 5, and 6, and is adapted to impinge on the lower arm 43 of an elbow 45. (See Fig. 3). This elbow has a hook 46 that in its normal position would engage the projection 91 at the front of the rack and type plate 80, and prevent the elevation of these plates, until the operation of the handle and connected parts. When the totalizing key 155 is depressed, the bar 160 is moved toward the front of the machine (to the right in Fig. 22). This causes the elbow 162 to swing on its pivot 163 and move the rod 164 downward to contact with the arms 43, that move hooks 46 out of the path of the projections 91 on the plate 81. If the main shaft 95 is now actuated, the restoring bar 103 is elevated and the rack and type plates rising under the influence of their respective springs 86, the engagement of their racks with the pinions on the numeral wheels, rotates all of the latter to "0." Now if the totalizing key 155 is released while the shaft 95 is at the end of its forward oscillation, its spring 154 will cause its elevation and move bar 160 rearwardly, (to the left in Fig. 22 and to the right in Fig. 16).

On the bar 160 is mounted a hook 168 engaging with a stud 169 on the lever 105 (see Fig. 16), and when the bar moves rearwardly the hook pulls on the stud and swings the lever 105 moving the numeral wheels out of engagement with their racks, and the racks move to the limit of their strokes. When the items are being enumerated and it is not desired to take a total, the hook 168 is disengaged from the stud 169 at each reciprocation of the bar 99, because the trip 112 engages a projection 170 of the hook 168, and lifts the latter out of engagement with stud 169; a reëngagement automatically taking place on the reverse reciprocation of the bar 99, which is assisted by spring 171 secured to the arm for that purpose.

In the operation of taking a total, the depression of key 155 will move the bar 160 forward or toward the right in Fig. 22, and toward the left in Fig. 16. The hook arm 168 carried by the bar 160 will thus be moved forward and release the pin 169 carried by the locking lever 105. But at this time, since the side bars 99 have not been advanced, the lever 105 would be held by the hook elbow 109 in engagement with its lower portion. In order to disengage the side lever from this hook, the bar 160 when advanced by the key 155 will engage the pin 172 on the arm 110 by the end of the slot 173 in the bar 160, and hence the hook 109 will move down to release the lever 105, so that the lever will not be arrested by this hook when the side bar is advanced from the total key. It will be understood that when the bar 160 is advanced by the total key, the pin 121 on the bar will shift the arm 116 away from the lug 106 on the bar 105, and therefore the bar 105 will not be restrained by the lever 118. Upon release of the total key at the end of the forward pull of the handle, that is, when the side bars 99 are in their forward position, the rearward movement of the lever 160 caused by the spring 154 that swings lever 165 to retract the key stem 166, will move the hook arm 168 on the bar 160 rearward, and its engagement with the pin 169 on the lever 105, will now move the lower end of lever 105 rearward carrying its upper end forward to shift all of the numeral pinions out of engagement with the rack bars. It will be understood that this is done after the rack bars have engaged the pinions at the beginning of the operation, and have returned them all to zero. The numeral wheels are thus left at zero and the machine is therefore clear. It will be further understood that if the total key is not released at the end of the forward stroke of the handle but is held depressed during the return stroke of the handle, then the bar 160 will not cause the hook arm 168 to shift the levers 105 carrying the pinions, and the pinions will remain in mesh, and hence will be rotated reversely and return to their former indicating positions that they held at the beginning of the operation. At the end of the operation the release of the total key will permit the retraction of the bar 160, and as set forth the hook lever 168 engaging the pin 169, will swing levers 105 and retract the numeral pinions from the rack bars. This is what is known as taking a sub-total, as in such operation the total is taken and printed, and instead of clearing the machine, the numeral pinions return to their positions occupied at the beginning of the sub-total operation.

The operation of these parts when the items are being enumerated is as follows:— After the desired item keys have been depressed, the handle is pulled forward, this will cause the side bars 99 to move toward the front, but the bar 160 will remain in its normal position. The side levers 105 are in their normal position as shown in Fig. 18, holding the numeral wheels away from the rack bars. At the latter part of the forward stroke of the bar 99, the trip 112 will strike the arm 110, and move the hook 108 away from lever 105. At the same time trip 112 will strike the arm 110 and raise the hook 108 to free the pin 109. This will leave lever 105 free to be swung by its spring 106, to carry the pinions into the path of the rack bars. On the return movement of the handle and side bar 99, the elbow levers 117 (see Fig. 25), will strike the lug 106 on the lever 105 and shift the side levers back to normal position moving the pinions away from the rack bars. It will be understood that the swinging of the lower arm 110 by the trip 112, will move the pin 172 forward in the slot 173 of bar 160, without disturbing this bar.

The machine is provided with a repeat key, by the depression of which an item enumerated on the keyboard may be indefinitely accumulated or repeated, once for each actuation of the main shafts. This key is mounted upon the plate 5 and comprises a finger piece 360 (see Fig. 1), and a depending stem 361 provided with a slot 362, and a notch 363 (see Fig. 16). This notch is adapted to engage with the edge of an aperture formed in the key plate 14 in order to hold key 360 depressed as long as desired.

A guide pin 364 secured to the plate 5 engages the slot 362 and also serves as a support for a spring 365, the other end of which is fastened to a link 366 secured by a slotted connection to the upper arm of an elbow 367 pivoted on the bar 99. The link 366 is provided with a slot 368 engaging with a guide pin 369 secured to the plate 5. The pivot of the elbow 367 is a rod 370 arranged across the machine, and which at its opposite end is supported on that one of the bars 99 which is on that side of the machine, depending from which is an arm corresponding to the lower arm of the elbow 367 (see Fig. 22).

It will be remembered that the keys after their depression to enumerate an item, are restored to their original undepressed position by means of the latch bar 22, which when it is lifted permits the disengagement of the notches 19 or 20, of the stop bar 9, from the stud 23 of the latch bar 22 with which such engagement has occurred, the tension of the spring 10 forcing the key to its original position. In the normal operation of the machine, the latch bar 22 is lifted at each reverse oscillation of the main shafts, in order that the depressed keys representing the item enumerated may be returned to their original positions so that a new item may be enumerated. This is accomplished by means of a pair of three-legged members 375 (see Figs. 15 and 16) one pivoted on the plate 6 and the other on the plate 5. Each member has a rearwardly extending leg 376, and between the two legs on the opposite sides of the machine is supported a cross rod 377 adapted to engage with and elevate the latch bar 22. Each member has a downwardly extending leg 378 provided with a roller 379, and each member has an upwardly projecting leg 380, provided with a projecting pin 381. Mounted on the bar 99 is the elbow 367 previously referred to. When the main shaft is oscillated, and the bar 99 is moved to the left (as seen in Fig. 13), the elbow 367 moves with it, the cross rod 370 moving in a slot 382 in the plates 4, 5 and 6, provided to permit such movement. During such forward movement the elbow 367 strikes the roller 379, and passes over it, because it swings on its pivot 370. After this contact ceases, a spring 383 retracts the elbow 367 to position against stop pin 384 on the bar 99. Of course it will be understood, that the link 366 will during such movement of the bar 99, swing on the pin 369 passing through its slot 368. During the reverse oscillation of the main shaft and the reverse movement of the bar 99, the elbow 367 contacts with the roller 379 on the leg 378, and being prevented from any forward oscillation on its pivot 370 by reason of the stop 384, it acts as a cam against the leg 378, (see Figs. 16 and 17) and trips the latter downward on its pivot and necessarily elevates the leg 376, and thus moves the cross rod 377 to lift the latch bars 22 (see Fig. 3), to permit the restoration of the keys to their normal positions.

It is obvious, that when a number is to be repeated the function of the restoration of the latch bars on the reverse movement of the shaft must be interrupted and this is accomplished by means of the repeat key referred to because, when the key is depressed, the elbow 367 is swung on the pivot 370 out of the path of roller 379, and the reverse reciprocation of bar 99 thereafter does not effect the elevation of the latch bars 22 through the three legged member 375. If the number is to be indefinitely repeated the notch 363 of the repeat key is engaged with the edge of the plate 14 and the key 361 is kept depressed.

In order to cancel an item enumerated on the keyboard without actuating the main shaft, the total key is brought into service, to lift the latch bars 22 by means of the rod 377. To that end the total bar 160 is provided with a latch elbow 387 (see Fig. 15) adapted to swing on a pivot 388, and provided with a retracting spring 389 and a stop pin 399. This elbow is adapted to engage the pin 381 on the leg 380 of the three legged member 375. When the total key is depressed the bar 160 is moved forward. This moves the latch elbow 387 in the same direction, and its latch end engaging with the pin 381 tilts the member 375 until its leg 376 lifts the arm 371 and elevates the latch bars 22 to permit the keys to return to their normal positions. When the total key is permitted to rise, the bar 160 is restored to normal position. The latch elbow 387 does not thereafter engage with the member 375 until the total key is again depressed, because the parts are so proportioned that the slight oscillation of the leg 380, which occurs in the normal operation of the machine, is permitted in the space above the latch arm of the elbow lever.

In the practical use of the machine it is sometimes desired to print or record an item without including it in the total to be accumulated, and conversely it is sometimes desirable to add an item into the total to be accumulated without recording or printing it. In other words, it is desirable temporarily to interrupt the function of the accumulating mechanism by the employment of a non-adding key.

The non-adding key comprises a key stem 390 (see Figs. 1 and 22), and a notch 392, the finger piece being hinged at its lower extremity to a crank arm 393 which is pivoted to a lever 394 adapted to oscillate an elbow 395, the latter being pivoted on a cross shaft 396 that has fast on its other end a trip 397. When the key 390 is depressed, through the train of mechanism just described, the trip 397 is tilted into the path of the trip 112 (see Fig. 16), so that when the bar 99 is drawn forward, the trip 112 does not engage arm 110 of hook 109, and lever 105 is not permitted to be tilted under the tension of its spring 108, and the numeral pinions do not engage their racks; such engagement being prevented as long as the non-add key is retained depressed, as by its engagement of the notch 392 with the top plate 14. A spring 398 serves to retract the key stem 390 to normal position (see Fig. 22).

In the actual operation of the machine, it sometimes happens that the operator will attempt to reverse the handle that actuates the main shaft, after it has partially moved in the proper direction, or he will attempt to actuate the handle to take a total when the total key has been partially depressed, and the numeral wheels are not in engagement with their racks. Means are provided to prevent both of these errors; in other words the machine is provided with means for rendering it "fool-proof."

On the main shaft 95, and outside of the plate 5 is mounted a sector 475 provided with peripheral notches 476 (see Fig. 23) and having two pins 478 and 479, and a lock pin 480 that projects through a slot in the side plate 5. Also pivoted on the plate 5 is a double pointed pawl 482 provided with a tail 483 and a spring 484. A locking arm 485 is mounted on the outside of the plate 5 and adapted to oscillate on a pivot 486, and is retracted by the spring 154. One end 487 of this arm is normally under a pin 488 on the stem 156 of the total key, and the other end 489 of the arm is adapted to abut against the lock pin 480. Mounted also on the outside of the plate 5 is an elbow 490 having an arm 491 and a spring 492, which elbow is provided with a hook 493 adapted to engage the pin 488 on the total key 156. When the handle 96 has been partially moved forward or the main shaft 95 has been otherwise oscillated, the sector 475 is moved forward and one of the points of the pawl 482 engages in its successive notches 476 and prevents backward movement of the sector and shaft. Similarly, after the reverse oscillation of the shaft has commenced, the other point of the pawl engages in the same notches in reverse order and prevents backward movement. By this means a full stroke of the handle, or a complete oscillation of the main shaft is always insured. When the total key is depressed, its pin 488 acting against the end 487 of the locking arm 485 moves the other end 489 of this arm against the lock pin 480 on the sector 475 and effectually prevents any movement of the latter, so that no actuation of the main shaft can take place until the total key 175 has been further depressed. As it is further depressed, its pin 488 moves downwardly and finally passes under the hook 493, and its backward movement is thus prevented. In the meantime the oscillation of the arm 485 has moved its extremity 489 away from the lock pin 480, and the handle 96 or the main shaft 95 may be thereafter actuated. The total key is released from the hook 493 by the movement of a part of the sector 475 contacting with the arm 491, and swinging the elbow 490 on its pivot. This disengages the pin 488 from the hook 493 and the total key rises under the influence of the spring 154.

Description has been given of the repeat key, the non-add key, as each provided with a depending stem having a notch adapted to engage with the edge of the plate 14 for holding such keys in position after depression. It is not however, always desirable to hold them, or any of them depressed during more than one oscillation of the main shaft, and it sometimes happens that the operator will inadvertently cause the engagement of the key stem by such notch moving under the plate 14, and thus use the key more than once when it is actually desired to use it but once. In order to avoid this accidental repeated use of such a key, means are provided whereby the key cannot be accidentally locked in a depressed position, but must be consciously moved by the operator to be so locked, and after being so locked must be positively and manually released in order to be restored to its original position. The device referred to is illustrated in Fig. 14, the repeat key being used for that purpose. In this view as in Fig. 22, the key stem is designated 410 and the finger piece 411. There is pivoted however to the plate 5 a latch 235, comprising a finger piece 236 and a hook 237 adapted to engage the pin 238 projecting laterally from the key stem. There is also a retracting spring 239. The key stem is slotted at 234 to allow it to pass the pivot 233 of the latch. When the key is depressed its stem 410 is moved downward until it reaches the end of its stroke. If nothing further is done, as soon as the downward pressure, due to the finger of the operator, is released, the key will naturally rise under the influence of its retracting spring. If it is to be retained in its depressed position, the operator must move the latch 235 so that its hook 237 will engage with the pin 238. This movement is against the tension of the spring 239 and cannot accidentally take place. When it has taken place the key will be held until it is manually released. This is accomplished by tapping the finger piece 411 lightly downward, because as soon as the pin 238 is moved below the plane of the beak of the hook 237, the spring 239 will pull the hook out of the path of the pin 238, and the key will be retracted upwardly by its spring.

Having thus described my invention, what I claim is:

1. A series of numeral wheels and an oscillatory arm on which each wheel is mounted to revolve, in combination with separate means whereby the arms may be oscillated separately, or in unison.

2. A series of numeral wheels and an oscillatory arm on which each wheel is mounted to revolve, in combination with means whereby the arms may be oscillated in unison as a system, and other means whereby they may be oscillated separately as separate units.

3. In a machine of the character described, a series of numeral wheels, and an oscillatory arm on which each wheel is mounted to revolve, in combination with means whereby the arms may be oscillated in unison as a system in the accumulation of an item, and other means whereby they may be oscillated separately in the carrying of a ten.

4. In a calculating machine, the combination with actuating devices, of independently movable supports mounted on pivots to have oscillatory movement only, a totalizer having register wheels which are operated by said actuating devices and carried by said supports, and means for moving said supports and their carried register wheels, substantially as described.

5. In a calculating machine, the combination with actuating devices, of independently oscillating supports, totalizer wheels operated by said actuating devices and carried by said supports, tripping projections on said totalizer wheels, and means under control of said tripping projections for effecting the movement of said supports and their carried wheels in the arc of a circle in performing the operation of carrying, substantially as described.

6. In a calculating machine, the combination with actuating devices, of supports mounted on pivots and independently movable in the arc of a circle thereon, totalizer wheels operated by said actuating devices and carried by said supports, tripping projections on said totalizer wheels, means under control of said tripping projections for effecting the movement of said supports and their carried wheels in performing the operation of carrying, and means for restoring said wheels, substantially as described.

7. In a calculating machine, the combination with actuating devices, of supports mounted on pivots and adapted to oscillate independently thereon, totalizer wheels operated by said actuating devices and carried by said supports, tripping projections on said totalizer wheels, means under control of said tripping projections for effecting the movement of said supports and their carried wheels in performing the operation of carrying while said wheels are in engagement with said actuating devices, and means for restoring said wheels while they are out of engagement with said actuating devices, substantially as described.

8. A series of oscillatory frames, a series of numeral wheels mounted thereon, each provided with a notched disk of substantially the same diameter, a pinion whereby it is rotated and a carrying cam, in combination with a series of fixed detents, each adapted to engage with the notched disk of its respective wheel while the machine is not actuated.

9. A series of oscillatory frames, a series of numeral wheels mounted thereon, each provided with a notched disk of substantially the same diameter, a pinion whereby it is rotated and a carrying cam, in combination with a series of fixed detents each adapted to engage with the notched disk of its respective wheel while the machine is not actuated, and means for moving all of the wheels away from the detents simultaneously.

10. A series of oscillatory frames, a series of numeral wheels mounted thereon, each provided with a notched disk of substantially the same diameter, a pinion whereby it is rotated and a carrying cam, in combination with a series of fixed detents, each adapted to engage with the notched disk of its respective wheel while the machine is not actuated, and means for moving all of the wheels away from the detents simultaneously, comprising a pair of levers, one on each side of the machine.

11. A series of numeral wheels, an independently oscillating frame on which each wheel is mounted to revolve, an arm extending from each frame, a spring on each arm constantly tending to oscillate the frame in one direction, and means adapted to move simultaneously against all of the arms to energize the springs.

12. A series of numeral wheels, an oscillatory arm on which each wheel is mounted to revolve, a spring on each arm constantly tending to oscillate the arm in one direction, and means adapted to move simultaneously against all of the arms to energize the springs, comprising a rod, a main shaft, and intermediate mechanism from the main shaft for actuating the rod.

13. A series of numeral wheels, each mounted to revolve on an oscillatory arm, a shaft on which all of the arms are adapted to oscillate, oscillatory supports for said shafts, and means for coupling the supports together, whereby the numeral wheels are caused to move together as a system while preserving their freedom of movement on their respective oscillatory arms.

14. A series of numeral wheels, each mounted to revolve on an oscillatory arm, a shaft on which all the arms are adapted to oscillate, oscillatory supports for said shafts, and means for coupling the supports together, consisting of a member rigidly secured to each support.

15. A series of numeral wheels, each mounted to revolve on an oscillatory arm, a shaft on which all of the arms are adapted to oscillate, oscillatory supports for said shafts and means for coupling the supports together, whereby the numeral wheels are caused to move together as a system while preserving their freedom of movement on their respective oscillatory arms, and means for moving the supports simultaneously.

16. A series of numeral wheels each mounted to revolve on an oscillatory arm, a shaft on which all of the arms are adapted to oscillate, oscillatory supports for said shafts and means for coupling the supports together, whereby the numeral wheels are caused to move together as a system while preserving their freedom of movement on their respective oscillatory arms, and means for moving the supports simultaneously consisting of a projecting pin on each support and a lever adapted to engage with each pin.

17. In a machine as set forth, the combination of a pair of side levers one on each side of the machine, numeral pinions carried by the levers, rack bars that are engaged by the pinions when shifted by said levers, a hook lever on each side normally engaging the side lever, a spring for each side lever to swing it when free, a side bar on each side of the machine reciprocated by the main shaft of the machine, and a trip on each side bar arranged to engage said hook lever to shift it to release the said side levers and permit the springs to move the levers to bring the pinions to engage the rack bars.

18. In a machine as set forth, the combination of a pair of side levers one on each side of the machine, numeral pinions carried by the levers, rack bars that are engaged by the pinions when shifted by said levers, a hook lever on each side normally engaging the side lever, a spring for each side lever to swing it when free, a side bar on each side of the machine reciprocated by the main shaft of the machine, a trip on each side bar arranged to engage said hook lever to shift it to release the said side levers and permit the springs to move the rack to bring the pinions to engage the rack bars, and a detent carried by each of the side bars arranged to normally engage the said side levers on the return stroke of the side bars to return the side levers to engagement with their hooks and shift the numeral pinions away from the rack bars.

19. In a machine as set forth, the combination of a pair of side levers one on each side of the machine, numeral pinions carried by the levers, rack bars that are engaged by the pinions when shifted by said levers, a hook lever on each side normally engaging the side lever, a spring for each side lever to swing it when free, a side bar on each side of the machine reciprocated by the main shaft of the machine, a trip on each sid bar arranged to engage said hook lever to shift it to release the said side levers and permit the springs to move the levers to bring the pinions to engage the rack bars, a detent carried by each of the side bars arranged to normally engage the said side levers on the return stroke of the side bars to return the side levers to engagement with their hooks and shift the numeral pinions away from the rack bars, a total key on the machine, a bar shifted by the total key, means on said bar to release the said side bars from their hooks when the total bar is actuated, and means on said total bar arranged to shift said detent away from operative position, whereby the numeral pinions will be shifted into position to engage the rack bars when the total key is depressed.

20. In a machine as set forth, the combination of a pair of side levers one on each side of the machine, numeral pinions carried by the levers, rack bars that are engaged by the pinions when shifted by said levers, a hook lever on each side normally engaging the side lever, a spring for each side lever to swing it when free, a side bar on each side of the machine reciprocated by the main shaft of the machine, a trip on each side bar arranged to engage said hook lever to shift it to release the said side levers and permit the springs to move the latter to bring the pinions to engage the rack bars, a detent carried by each of the side bars arranged to normally engage the said side levers on the return stroke of the side bars to return the side levers to engagement with their hooks and shift the numeral pinions away from the rack bars, a total key on the machine, a bar shifted by the total key, means on said total bar to release the said side bars from their hooks when the total bar is actuated, means on the total bar arranged to shift said detent away from operative position, whereby the numeral pinions will be shifted into position to engage the rack bars when the total key is depressed, and a hook arm carried by the total bar that serves to engage the said side levers to swing the numeral pinions away from the rack bars when the total lever is released at the end of the forward stroke of the side bars to clear the machine.

21. In a machine as set forth, the combination of a pair of side levers one on each side of the machine, numeral pinions carried by the levers, rack bars that are engaged by the pinions when shifted by said levers, a hook lever on each side normally engaging the side lever, a spring for each side lever to swing it when free, a side bar on each side of the machine reciprocated by the main shaft of the machine, a trip on each side bar arranged to engage said hook lever to shift it to release the said side levers and permit the springs to move the latter to bring the pinions to engage the rack bars, a detent carried by each of the side bars arranged to normally engage the said side levers on the return stroke of the side bars to return the side levers to engagement with their hooks and shift the numeral pinions away from the rack bars, a total key on the machine, a bar shifted by the total key, means on said total bar to release the said side bars from their hooks when the total bar is actuated, means on the total bar arranged to shift said detent away from operative position, whereby the numeral pinions will be shifted into position to engage the rack bars when the total key is depressed, and a hook arm carried by the total bar that serves to engage the said side levers to swing the numeral pinions away from the rack bars when the total lever is released at the end of the forward stroke of the side bars to clear the machine, said trip on the side bar being also arranged to engage said hook on the total lever to shift it out of operating position when the side bar is advanced.

22. In a machine as set forth, the combination of a pair of side levers one on each side of the machine, numeral pinions carried by the levers, rack bars that are engaged by the pinions when shifted by said levers, a hook lever on each side normally engaging the side lever, a spring for each side lever to swing it when free, a side bar on each side of the machine reciprocated by the main shaft of the machine, a trip on each side bar arranged to engage said hook lever to shift it to release the said side levers and permit the springs to move the latter to bring the pinions to engage the rack bars, and a key-controlled member arranged to shift said trip out of position for engagement with the hook levers.

23. In a machine as set forth, the combination of a pair of side levers one on each side of the machine, numeral pinions carried by the levers, rack bars that are engaged by the pinions when shifted by said levers, a hook lever on each side normally engaging the side lever, a spring for each side lever to swing it when free, a side bar on each side of the machine reciprocated by the main shaft of the machine, a trip on each side bar arranged to engage said hook lever to shift it to release the said side levers and permit the springs to move the latter to bring the pinions to engage the rack bars, a detent carried by each of the side bars arranged to normally engage the said side levers on the return stroke of the side bars to return the side levers to engagement with their hooks and shift the numeral pinions away from the rack bars, a total key on the machine, a bar shifted by the total key, means on said bar to release the said side bars from their hooks when the total bar is actuated, means on the total bar arranged to shift said detent away from operative position, whereby the numeral pinions will be shifted into position to engage the rack bars when the total key is depressed, a hook arm carried by the total bar that serves to engage the said side levers to swing the numeral pinions away from the rack bars, when the total lever is released at the end of the forward stroke of the side bars to clear the machine, and a key controlled member arranged to shift said trip out of position for engagement with both said hook levers.

24. In a machine as set forth, the combination with the side bars reciprocated at each operation of the machine, and the latch bars, of a lever pivoted on each side of the machine adjacent each side bar, a rod connecting said levers across the machine and arranged to engage all of the latch bars when the levers are swung, a shaft having its ends journaled in the side bars respectively to travel as they are moved, a lever pivoted at each end of said shaft adjacent said levers respectively and arranged to coöperate therewith to shift said levers as the side bars are moved in one direction to thereby retract the latch bars from said rod.

25. In a machine as set forth, the combination with the side bars reciprocated at each operation of the machine, and the latch bars, of a lever pivoted on each side of the machine adjacent each side bar, a rod connecting said levers across the machine and arranged to engage all of the latch bars when the levers are swung, a shaft having its ends journaled in the side bars respectively to travel as they are moved, a lever pivoted at each end of said shaft adjacent said levers respectively and arranged to coöperate therewith to shift said levers as the side bars are moved in one direction to thereby retract the latch bars from said rod, and a key-controlled device arranged to shift said shaft-carried levers out of operative position.

26. In a machine as set forth, the combination with the side bars reciprocated at each operation of the machine, and the latch bars, of a lever pivoted on each side of the machine adjacent each side bar, a rod connecting said levers across the machine and arranged to engage all of the latch bars when the levers are swung, a shaft having its ends journaled in the side bars respectively to travel as they are moved, a lever pivoted at each end of said shaft adjacent said levers respectively and arranged to coöperate therewith to shift said levers as the side bars are moved in one direction to thereby retract the latch bars from said rod, a total key on the machine, a bar advanced by said total key when operated, and a latch on said total bar arranged to connect with said levers on the side bars to shift them to actuate the said latch bars.

27. In a machine as set forth, the combination with the side bars reciprocated at each operation of the machine, of a lever pivoted at each side plate, a set of latch bars, a rod connecting said levers across the machine adjacent the latch bars to shift the latch bars when the levers are swung, a shaft pivoted at its ends to the side bars to travel therewith, a lever on each end of said shaft adjacent said levers, a pin on each side bar adjacent the levers carried thereby, a spring pressing each of the latter levers against said pin, a projection on said first mentioned levers arranged to be engaged by said side bar levers on movement of the side bars to thereby swing said levers and shift the latch bars, and a controlling key connecting with one of said shaft carried levers and arranged to shift said levers out of operative position.

28. In a machine as set forth, the combination with the side bars reciprocated at each operation of the machine, of a lever pivoted on each side plate, a set of latch bars, a rod connecting said levers across the machine adjacent the latch bars to shift the latch bars when the levers are swung, a shaft pivoted at its ends to the side bar to travel therewith, a lever on each end of said shaft adjacent said levers, a pin on each side bar adjacent the levers carried thereby, a spring pressing each of the latter levers against said pin, a projection on said first mentioned levers arranged to be engaged by said side bar levers on movement of the side bars to thereby swing said levers and shift the latch bars, a total key on the machine, a bar at each side of the machine that are advanced by the total key, an arm on each of said first mentioned levers, and a latch on each total bar arranged to engage said latter arm to shift the bar that engages the latch bars to restore the latch bars.

29. In a machine of the character described, a key, means separate from the key whereby, when the key is depressed, it is locked against upward movement, in combination with means whereby it is automatically unlocked when it is again depressed.

30. In a machine of the character described, a key provided with a key stem and with means separate therefrom, whereby when the key is depressed, it is locked in a depressed position, comprising a catch on the key stem, a pivoted latch adapted to coöperate therewith, and means for normally holding them out of engagement, in combination with means for automatically unlocking the key when it is again depressed, comprising a spring adapted to retract the latch whereby its engagement with the catch on the key stem is prevented.

31. In a machine of the character described, a key provided with a stem, a pin on the stem, a pivoted latch, a spring on the latch normally holding it out of range within said pin, said latch having a catch portion arranged to engage said pin and holding the stem of the key in depressed position, and also arranged upon further depression of the key to release said pin and return to normal free position.

32. In a machine as set forth, the combination with a main operating shaft, of a sector mounted on the shaft and provided with abutments in its periphery, a double pawl engaging the sector abutments to prevent reverse movement of the sector after initial movement in either direction, means for reversing the pawl at each end of the stroke, a total key on the machine, a spring controlled latch arranged to engage said key when depressed to lock it down, said latch being engaged by the said sector at the latter part of its advance movement to trip the latch and release the total key.

JASON C. LOTTERHAND.

Witnesses:
E. M. SQUAREY,
C. M. REYNOLDS.